Sept. 7, 1943.  H. F. TEICHMANN  2,329,146
MANUFACTURE OF HOLLOW GLASS ARTICLES
Filed May 29, 1941   5 Sheets-Sheet 2
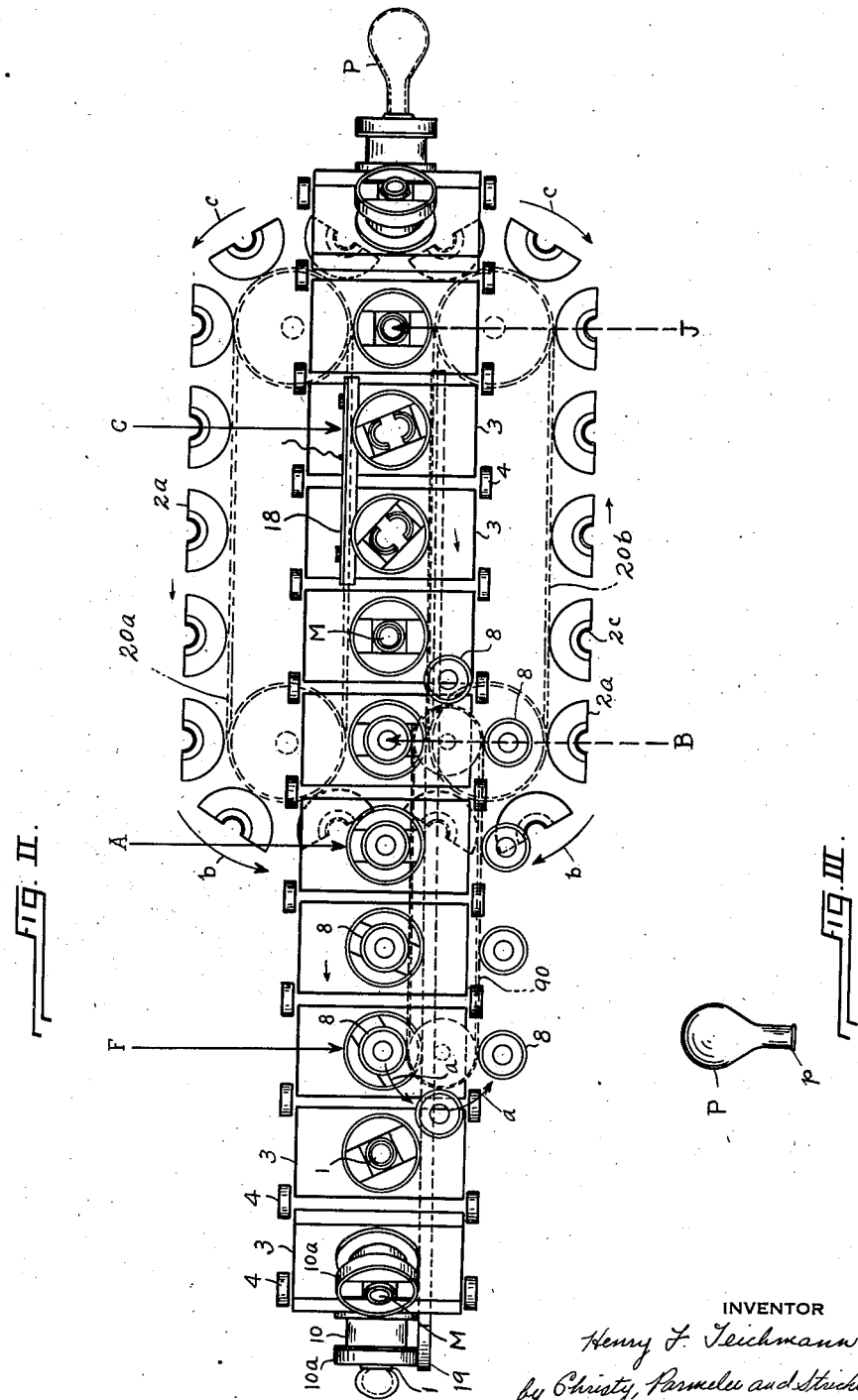

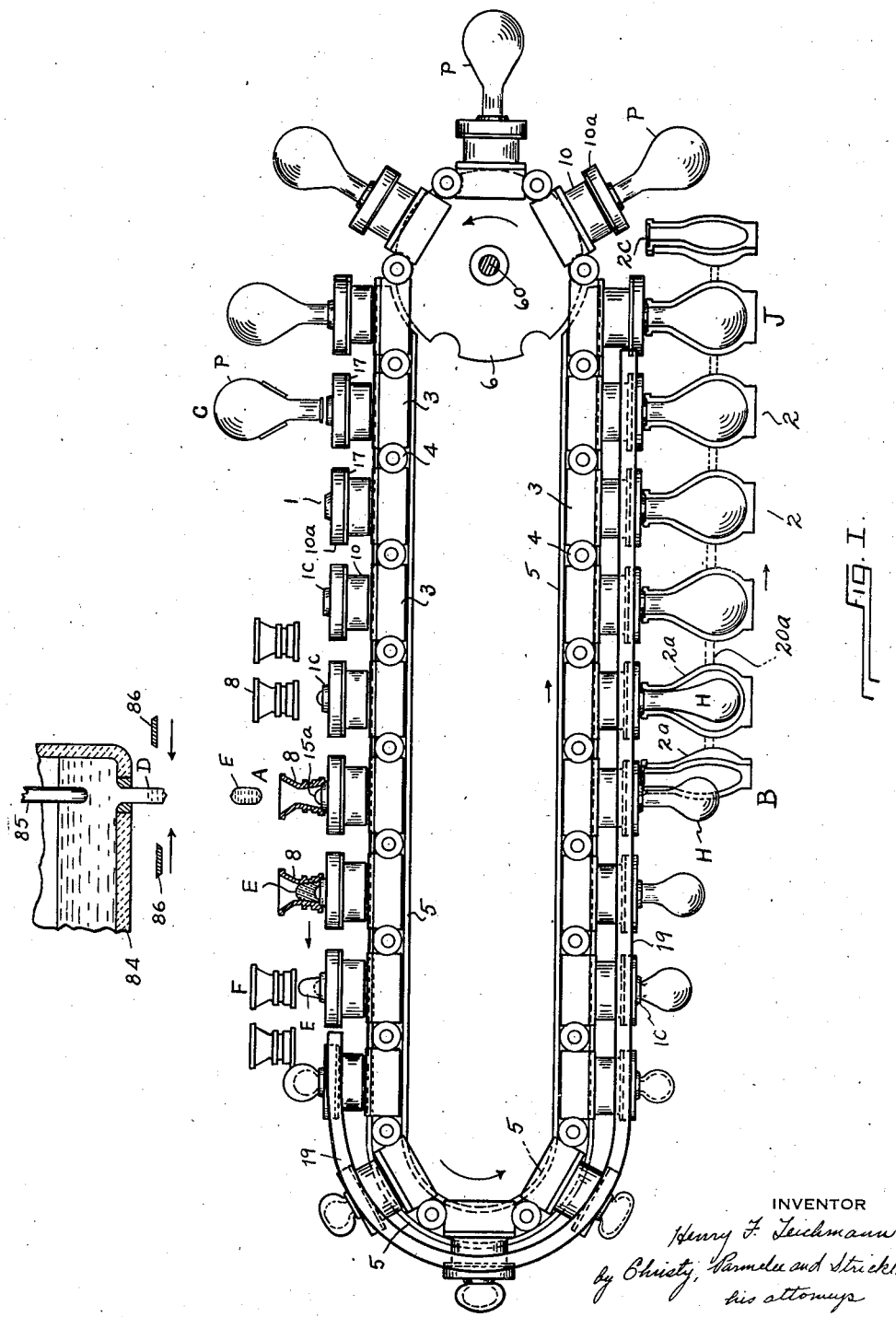

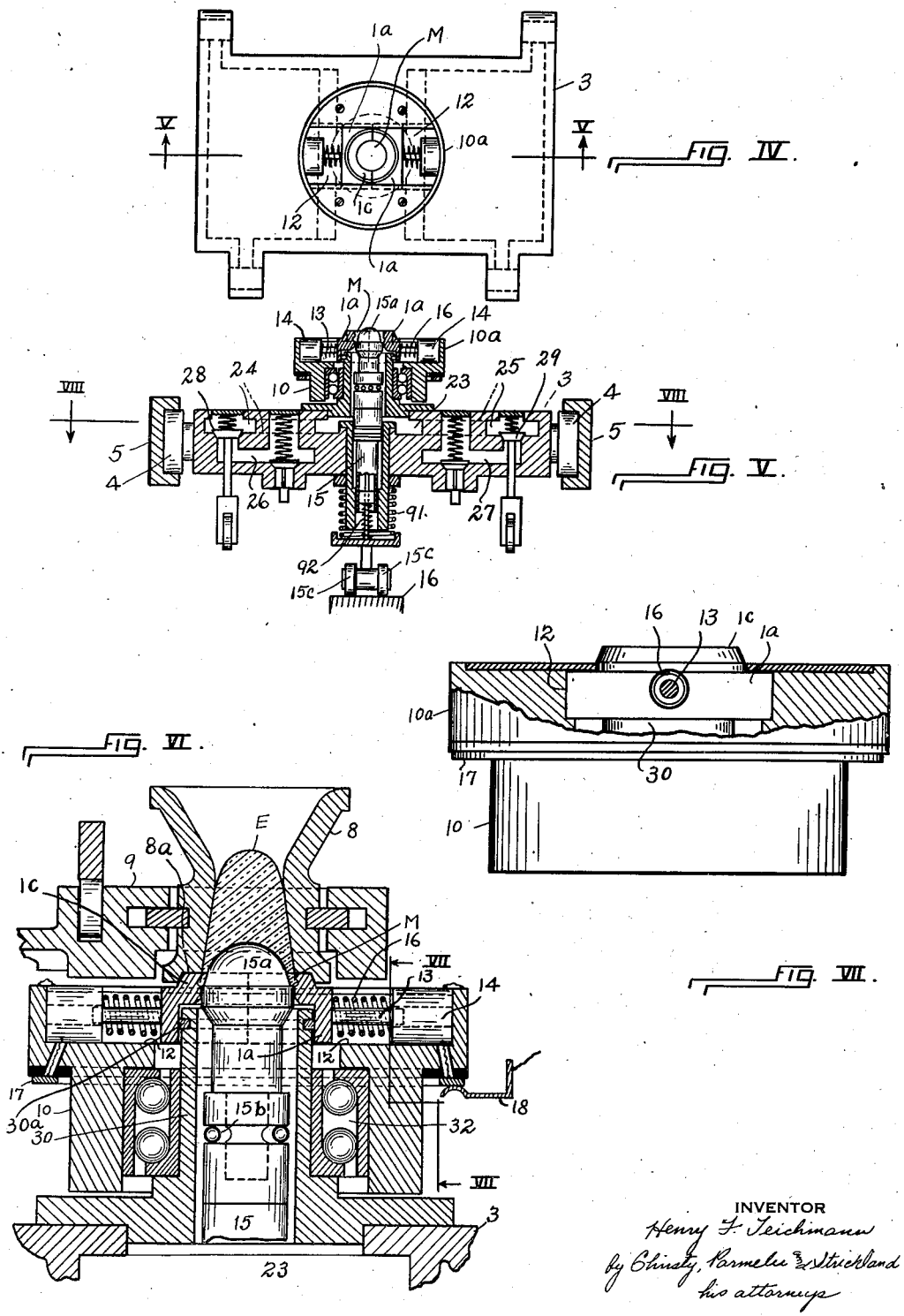

Sept. 7, 1943.    H. F. TEICHMANN    2,329,146
MANUFACTURE OF HOLLOW GLASS ARTICLES
Filed May 29, 1941    5 Sheets-Sheet 4
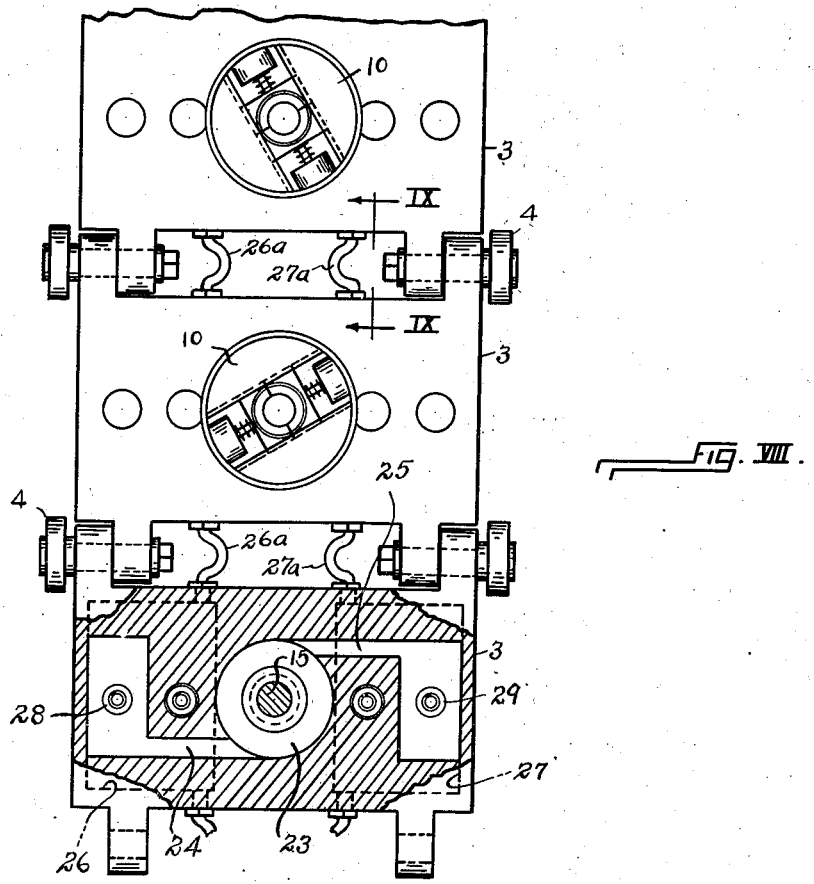
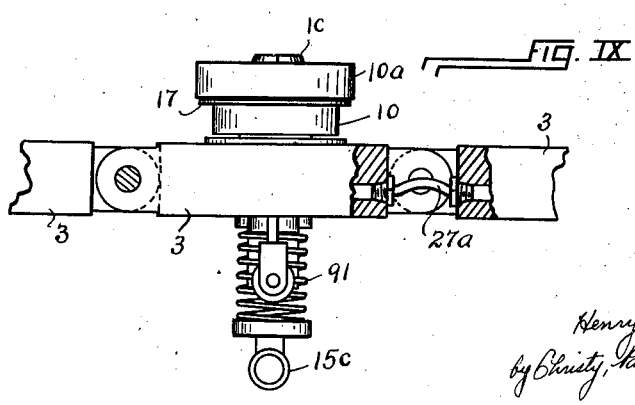
INVENTOR
Henry F. Teichmann
by Christy, Parmelee and Strickland
his attorneys

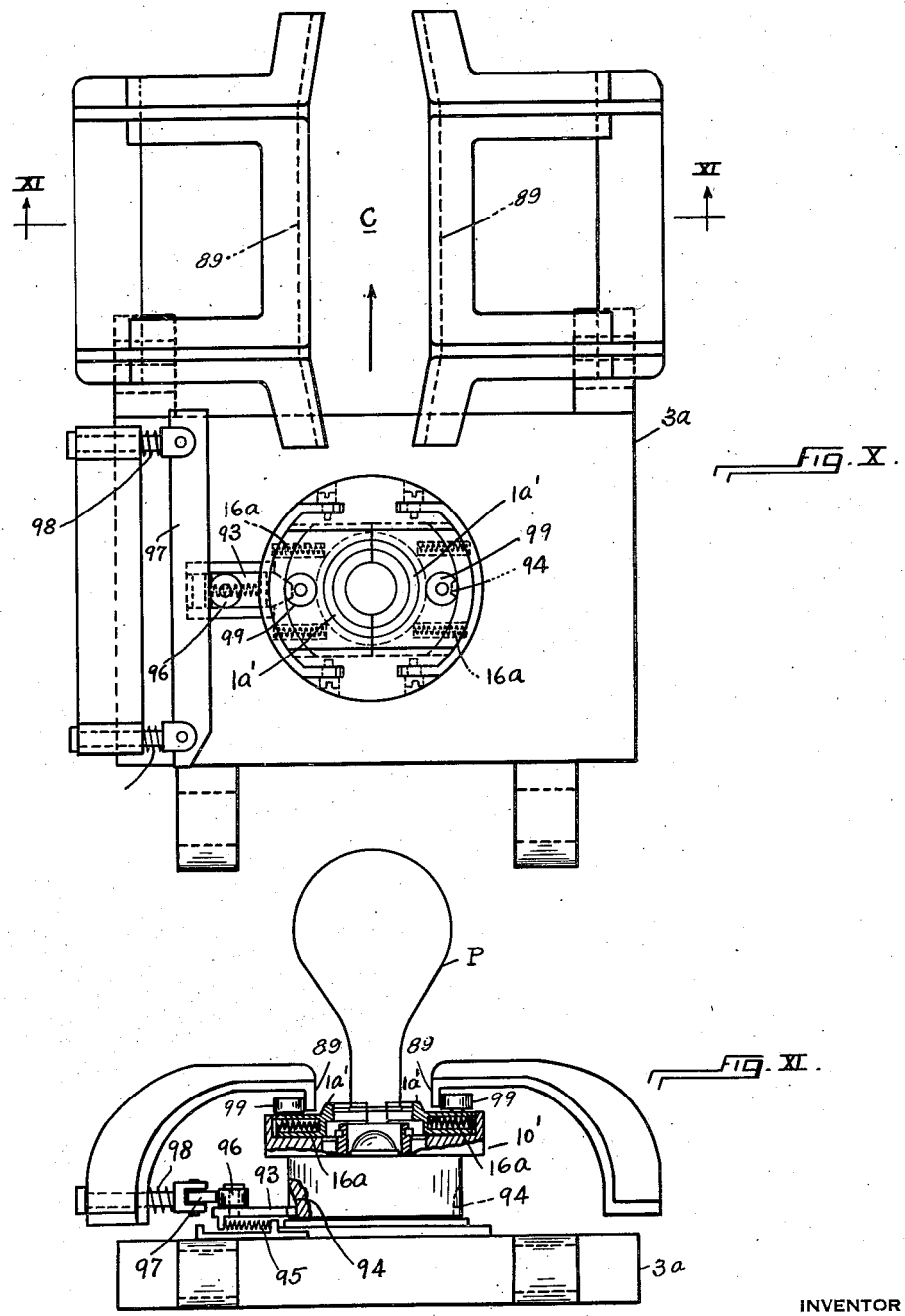

Patented Sept. 7, 1943

2,329,146

UNITED STATES PATENT OFFICE 2,329,146

MANUFACTURE OF HOLLOW GLASS ARTICLES

Henry F. Teichmann, Washington, Pa.

Application May 29, 1941, Serial No. 395,767

4 Claims. (Cl. 49—5)

My invention relates to the production of hollow glass articles, typically incandescent-lamp bulbs, and consists in improvements both in method and in apparatus.

The invention embraces certain refinements and modifications of the apparatus and method described in my applications for Letters Patent Serial Nos. 298,775 and 361,716, filed October 10, 1939, and October 18, 1940, respectively. The present application is a continuation-in-part of such applications.

The principal objects in view are superiority in quality of product, and greater speed and economy in production.

The apparatus in which and in the operation of which the invention is realized includes a plurality of traveling neck-molds that, advancing in succession through a charging station, are adapted to receive each a gob of plastic glass. Within the cavity of each neck-mold the glass is shaped in part, and in and by virtue of such shaping of a portion of the gob to the rim or wall of such cavity the gob is anchored to the mold. The charged neck-molds advance successively to a blowing station, where a traveling succession of blow-molds unite with the neck-molds and severally enclose the glass charges; in the advance of the united mold parts through the blowing station the shaping of the glass is brought to completion; the blow-molds open, and the completed glass articles, still anchored to the advancing neck-molds, enter a discharge station. The neck-molds are segmental in structure (bipartite in this case), and in the discharge station means function momentarily to spread the neck-mold segments, whereby the finished articles may be removed.

In the accompanying drawings—

Figure I is a diagrammatic view, showing an apparatus of the invention partly in side elevation and partly in vertical section;

Figure II is a diagrammatic view in plan from above of the apparatus;

Figure III is a view in side elevation of an incandescent-lamp bulb, which in this case is shown to be the product of the apparatus and method;

Figure IV is a view in plan from above and to larger scale of one of the neck-mold units of the apparatus;

Figure V is a view of the same in vertical section, on the plane V—V of Figure IV;

Figure VI is a fragmentary sectional view, showing to still larger scale and on the same plane of section as Figure V a neck-mold and the head that carries it, together with a funnel member that cooperates with the mold when the apparatus is in operation. In Figures IV, V and VI electro-magnetic means, for spreading the neck-mold segments in the discharge station, are illustrated;

Figure VII is a view of the neck-mold-supporting head partly in side elevation and partly in vertical section, on the plane VII—VII of Figure VI;

Figure VIII is a view on the scale of Figure V of a portion of the endless chain of mold-carrying units of the apparatus, one of the units appearing in section, on the plane VIII—VIII of Figure V, and the others in plan from above;

Figure IX is a fragmentary view of the chain, partly in side elevation and partly in section, on the plane IX—IX of Figure VIII;

Figure X is a view to larger scale than Figures VIII and IX, showing in plan modified means for spreading the neck-mold segments; and Figure XI is a sectional view, on the plane XI—XI of Figure X.

In the production of incandescent-lamp bulbs in accordance with a prevailing practice, a body of glass in plastic condition is formed into a hollow blank; the blank is introduced to a blow-mold, and in such mold is inflated or blown to the shape of the bulb. The plastic body of the so-shaped bulb is solidified in the mold; the mold is opened; and the finished article is removed.

Considering the procedure more specifically, the body or charge of plastic glass is anchored to the rim of an orifice in a horizontally extending neck-mold or orifice-plate, and under the influences of pneumatic pressure and gravity the so-anchored glass is formed into a hollow, pouch-shaped blank that hangs downward from the mold. A blow-mold is then assembled with the neck-mold and encloses the blank; and in the cavity formed by the united molds the blank is blown to a lamp bulb. During such blowing of the glass, the blow-mold is (usually) rotated upon the enclosed body of glass that is held against rotation by the orificed mold element.

In practice, a plurality of neck-molds is arranged in series on an endless traveling chain, and, in the course of advance of the chain, plastic glass is fed to the orifices of the successive molds, and formed into a succession of said hollow blanks. Organized with such chain of neck-molds is an endless chain of blow-molds that travels in synchronism with the neck-molds. In the coordinated advances of the two chains the blow-molds are rotated, and, rotating, they successively come to engagement with the neck-molds, and enclose the hollow blanks of glass carried thereby. As the mold parts thus successively enclose the hollow blanks of plastic glass, air under superatmospheric pressure is caused to inflate or blow the glass into lamp bulbs. In the ordered advance of the two chains, the mold parts remain in engagement until the shaped glass solidifies; then the mold parts open, and the formed articles are removed.

With such known procedure in mind, it will be understood that the method of my invention consists in certain modifications and refinements.

In accordance with the invention, I effect a controlled rotation of the neck-molds, or orifice-plates, and in such manner subject the charges of plastic glass anchored thereto to the influence of centrifugal force. In the bulb-forming operations pneumatic pressure is also employed, and, by the proper proportioning of the pneumatic pressure and rotative stress, the shaping of the glass is more accurately controlled. Not only do I provide (with manifest advantage) a more uniform distribution of the glass in the bodies of the hollow blanks, but in the finished bulbs I obtain greater uniformity of wall thickness. In consequence, the thermal stresses and strains in the glass bulbs which are shaped and solidified in the blow molds are so far equalized that breakage of the bulbs, if not wholly eliminated, is reduced to a minimum.

The distinctive features of my method will be more fully understood upon considering a description of the apparatus illustrated in the accompanying drawings. The apparatus includes a plurality of traveling neck-molds 1 adapted severally to receive, at station A, successive gobs of plastic glass. Within the shallow, orifice-like matrices M of the neck-molds the glass is shaped in part, and in such shaping of a portion of the gob to the rims or walls of the matrices the gobs are anchored to the mold elements. The charged mold elements come successively, at station B, to assembly with blow-mold elements 2, and form completed molds, within which the shaping of the glass is brought to completion. The finished articles are removed from the machine at station C.

The neck-molds or mold elements 1 are severally carried upon heads 10, and the heads 10 are severally rotatably borne upon plate-like support members 3. The support members 3 are articulated as shown in Fig. I, forming an endless chain. The axles upon which the support members are articulated project laterally and carry rollers 4 that are engaged in a pair of stationary guideways 5 (but one of them appears in Fig. I), spaced apart transversely of the apparatus. The chain extends in a vertical plane with upper and lower horizontal reaches, interconnected by rounded courses at the ends, and at one end a pair of rotary sprocket wheels 6 mounted on an axis 60 engages the rollers 4 on the two sides of the chain. The sprocket wheels 6, driven by suitable means (not shown), cause the endless chain to advance in the counter-clockwise direction indicated by arrows in Fig. I.

A plurality of traveling funnel members 8 co-operates with the mold elements 1. These funnel members are carried upon blocks 9 (Fig. VI) which are articulated in an endless chain, as indicated diagrammatically, at 90, in Fig. II. The chain 90 is (as described in my above-noted application Serial No. 361,716) caused to travel in synchronism with the chain of supports 3. The mold elements 1 circulate in a vertical plane; the funnel members 8 in a horizontal plane, in the direction indicated by arrows a in Fig. II; and the arrangement is such that, as the mold elements 1 advance from right to left in the upper reach of the chain, and at a point to the left of point C, the funnel members come severally to vertical alignment with the mold elements 1, and continue in such alignment to a point F to the left of point A (Figs. I and II). When the point F has been reached the funnel members 8 recede again; again note arrows a in Fig. II.

As each advancing funnel member 8 comes to vertical alignment with an advancing mold element 1, instrumentalities (not shown here, but described in said application Serial No. 361,716) function vertically to shift the funnel member downward into engagement with the mold element. This is accomplished when the point A is reached, and the engagement of the parts is maintained throughout the interval of travel between points A and F. Note the funnel members shown in section in Fig. I. At point A a gob E of glass is delivered into the united funnel member and mold element, and in the advance of the united members from point A to point F the lower portion of the gob is shaped to the matrix of the mold element. Upon reaching the point F, the funnel member is lifted from engagement with the mold element. In the advance of the mold element from point F to point B, the mold-carrying head 10 is rotated; air under superatmospheric pressure is admitted to the matrix of the mold element; and the body of plastic glass anchored to the mold element is, under the influences of pneumatic pressure and centrifugal force, expanded in the open atmosphere to a hollow, pouch-shaped blank H. At the point B a blow-mold 2, of usual bipartite construction, closes upon the blank, and, with the mold element 1 and blow-mold 2 thus united and advancing together, but with the mold element 1 and the supported blank H rotating relatively to the blow-mold, the blank is blown to a lamp bulb P. At the point J in such course of advance, the blow-mold opens, and the formed bulb is in the continuous circulation of the chain of members 3 carried to the point C, where it is removed from the mold element 1, by means of instrumentalities with which this invention is not immediately concerned.

The mold elements 1 are compound, each formed of two complementary parts 1a borne in a head 10 that is mounted, on anti-friction bearings 32, for rotation on a tubular journal 30 carried rigidly by the associate support member 3. In the cyclic operation of the machine these parts are closed, to serve unitedly (at point A) their essential mold function, and are opened (at C), to release the finished article. In the travel of the united mold parts from point F to point J the head 10 is positively rotated, the means to such end being in exemplary way shown as a wheel-like enlargement 10a on the body of the head that makes rolling contact with a friction rail 19 that parallels the course of mold travel between such points. The two parts 1a of each mold element are severally mounted in slideways 12 formed in the rotary head 10. To each of the two mold parts 1a the armature 13 of an electro-magnet 14 is united; the two electro-magnets are severally secured in the radially outer ends of the two slideways 12 in head 10, and between each magnet and the associate mold part 1a is arranged a compression spring 16. The springs 16 serve normally to maintain the two mold parts in abutment, concentric with the axis of the rotary head 10 (in which position of abutment they serve their mold function), but the electro-magnets, energized when the united work-bearing mold reaches the point C, overcome the stress of the springs and draw the mold members apart for removal of the work. One electric terminal of each magnet is grounded through the metal body of head 10 to the framework of the machine, while the other terminal is electrically connected to a contact ring 17 carried by, but insulated from, the head 10. The circuit for energizing the magnets includes a contact strip 18 which is suitably supported in the position shown in Fig. II, to be engaged by the contact ring 17 of the head 10 as it reaches and advances through the work-releasing station C. The magnets 14 are energized and the mold members 1a stand apart so long as the ring 17 of the advancing head remains in contact with the strip 18, and it is to be noted that, by virtue of this structural organization, it is not necessary that the rotary head be oriented in any particular angular position, to permit of the functioning of the mold-spreading instrumentalities. Indeed, the head 10 may be in rotation, while the ring is advanced along the contact strip 18, without affecting the mold-spreading operation, and thus it is that the rotation of the mold-carrying head (herein shown to be intermitted at point J) may, if desired, be maintained throughout the path of mold circulation.

Each support member 3 carries a vertically reciprocable plunger 15, Fig. V. This plunger is by the tension of a spring 91 normally held in retracted position; but, in the circulating travel of the chain of members 3, the outer end of the plunger, equipped with wheels 15c, engages a stationary rail 16 (fragmentarily shown in section in Fig. V), and by such engagement the plunger is shifted against the tension of spring 91, and the end 15a of the plunger projected upwardly into the orifice-like cavity within the united mold parts 1a. The thrust thus moving the plunger into the mold cavity is transmitted through spring 92. For more particular details of the plunger-operating mechanism, reference may be had to my copending applications, above noted.

The end 15a of the projected plunger becomes a mold member, and provision is made that it may rotate with the united mold parts 1a. Specifically, the upper end of the plunger is mounted to rotate on a race of ball-bearings 15b.

In the body of each support member 3, a chamber or chest 23 is provided, and from such chamber lateral passages 24 and 25 (Figs. V and VIII) extend; from these passages severally there is valve-controlled communication with lateral chambers 26 and 27, and the valves 28 and 29 that control such communication close under spring tension. The base of the tubular journal 30 opens at its lower end (as seen in Figs. V and VI) into the chamber 23; the tubular journal extends at its upper end into a cylindrical recess in the body of the united mold 1; communication between the chamber 23 and the matrix of the mold is afforded by means of clearances between the body of the plunger and the internal surfaces of the tubular journal 30 and the mold 1; and a ring-gasket 30a provides an air-tight engagement of the mold with the upper end of the journal. A supply of air under pressure is maintained in chamber 27, and a condition of vacuum in chamber 26, and in the course of machine operation the valves 28 and 29 are alternately unseated against spring tension, establishing in chamber 23 alternately a condition of vacuum and of pneumatic pressure. The means for establishing and maintaining conditions of vacuum and air pressure severally in chambers 26 and 27, and the means for opening the valves 28 and 29 at the desired points in the circulation of the mold elements 1, are fully described in my said copending applications, and repetition herein is needless to an understanding of my present invention. Suffice it to say that, in the circulation of the chain of mold elements 1, the means described in my other applications function to effect the movement of the plunger 15 and the shifting of the valves 28 and 29 in proper sequence in the following operations:

As a mold 1 advances, with its parts 1a united, in right-to-left direction (Figs. I and II) to point A, the plunger associated with the mold is shifted to the projected position in which it is shown in Fig. VI. When the mold reaches the point A, a funnel member 8 closes upon it and forms a matrix, ready to receive a gob E of glass. It will be perceived that the mold 1 includes an annular portion 1c that rises from the face of the head 10. The funnel member 8 is formed at its lower edge with complementary recess 8a. Thus, when the funnel member closes upon the mold, the union of the parts is perfect. The bore of each funnel member conforms in shape to an hour-glass, and the downwardly divergent portion of the bore forms in effect a continuation of the cavity M of the mold; indeed, the matrix that receives the gob of glass is formed by the upper end of the plunger, the lower bore portion of the funnel member, and the portion of the mold cavity M which encompasses the upper end 15a of the plunger. The upwardly diverging bore portion of the funnel member 8 serves to direct into such matrix a gob of glass dropped into the mouth of the funnel member.

The means for delivering gobs of glass to the succession of matrices, thus provided by the united mold and funnel members, consist in the fore-hearth 84 of a glass tank. The fore-hearth includes a delivery orifice, with a flow-controlling rod 85 adjustably positioned above it, arranged to deliver freely and continuously under gravity a stream D of molten glass in line directly above the succession of molds 1. A pair of shear blades 86 is mounted to reciprocate across the stream of glass D, and, in co-ordination with one another, to shear the descending column of glass into a succession of gobs E. The shears are, by appropriate means, driven at appropriate speed in synchronism with sprocket wheels 6. Such glass-feeding means deliver a succession of gobs E that fall one by one into the advancing matrices.

Immediately before an advancing mold 1 reaches point A, a condition of suction is established in the chest 23 of the associate support member 3, and when, upon reaching point A, a gob E of plastic glass enters the assembled funnel member and mold, such suction is effective, through the clearance (above mentioned) between the head of the plunger 15 and the mold body, to draw the gob E inward and shape it minutely to the form of the matrix. See Fig. VI.

The circular cavity of mold 1 includes a circumferential groove in which glass is shaped to form a bead $p$ at the mouth of the bulb (Fig. III), and it will be understood that, by the shaping of the lower portion of the gob of glass to such mold cavity, the gob is anchored to the mold. Upon reaching and passing the point F, the funnel member is lifted from the mold; the vacuum in chest 23 is broken; the wheel portion 10a of the advancing mold-bearing head 10 engages the friction rail 19 and the mold 1, the plunger tips 15a and the glass charge E are set in rotation; air under pressure is admitted to chest 23 and the plunger is retracted. While the rotating charge of glass is thus subject to the influence of centrifugal force, air flowing from the chamber 23 into the matrix of the mold element 1 expands the still plastic body of glass, bubble-like, in the open atmosphere.

Rounding the left-hand end of the course of the chain of molds, the body of glass is progressively expanded under the influences of both centrifugal force and internal air pressure, and upon entering the lower reach of the chain, gravity also becomes effective upon the glass. The blank is completely formed by the time the mold 1 reaches the point B, and at such point a blow-mold 2 closes upon it.

Each blow-mold 2 is formed of two complementary mold parts 2a, and the several mold parts 2a that form the succession of blow-molds are arranged in two endless traveling chains 20a and 20b, as shown in Fig. II. The particular structure of the chains and the manner in which they may be mounted for travel in the machine will be perfectly apparent to the engineer, and for present purposes the diagrammatic illustration in the drawings will suffice. The two chains are arranged to travel in common horizontal plane beneath the lower reach of the chain of mold elements 1. The chains travel in synchronism with the molds 1, and, as each mold 1 advances with a suspended blank H to the point B, a blow-mold closes upon it; that is, a mold part 2a on chain 20a closes upon a corresponding mold part 2a on chain 20b (cf. arrows $b$ in Fig. II), enclosing the blank depending from the mold 1. Each blow-mold part includes a recess 2c (Fig. II) that receives the annular portion 1c of the mold 1, whereby the engagement of the united mold parts 1, 2 is snug, providing practically a seamless matrix. Within the matrix thus formed by the united mold members, the plastic blank H is gradually blown to a lamp bulb. The mold 1 and the supported blank rotate while the shaping of the glass is thus brought to completion. As the mold assembly reaches the point J, the advancing chains 20a and 20b enter the rounded courses indicated by the arrows c, Fig. II; the blow-mold halves 2a separate, and recede from the finished bulb. The glass body of the bulb P, now solidified but still anchored to the mold 1, advances to the point C; the flow of air to the chamber 23 is interrupted; the mold parts 1a are drawn apart, in the manner already described; and the finished bulb is removed.

It is to be noted that the engagement of the united blow-mold parts 2a with the rotating molds 1 provides a mechanical integration of the chains 20a and 20b with the powerfully driven chain (3) that carries the molds 1, whereby the chain of molds 1 serves as the driving means for the chains that carry the blow-mold parts 2a. If found desirable, however, a positive, synchronized drive for the blow-mold chains may be provided.

In the apparatus disclosed in my earlier applications the pins that articulate the chain of mold supports 3 are hollow, and the vacuum chambers 26 in the successive mold supports communicate with one another through passages that open through the pins on one side of the chain, while the air chambers 27 communicate with one another through passages extending through the pins on the other side of the chain. The intercommunicating chambers 26 of the several mold carriers 3 form in effect a single chamber in which a vacuum is maintained, and the intercommunicating chambers 27 form in effect a single chest that is charged with air under pressure. Herein, more effective means have been devised for establishing such intercommunication of the chambers 26 and 27. Such means, illustrated in Figs. VIII and IX, consist in flexible hoses 26a and 27a. The line of communicating chambers 26 provides in effect a single vacuum chest in the chain of mold carriers, while the communicating chests 27 form in effect a single air chest.

In Figs. X and XI modified means are shown for opening or spreading the two parts of the neck-molds as they advance through the work-releasing station C. Whereas the means above described for this purpose comprise electrically operated magnets, the modified means are purely mechanical. As shown in these figures of the drawings, the neck-mold sections 1a', normally held by springs 16a in closed or united position, severally carry rollers 99 which, in the advance of the mold into the discharge station C, severally engage spaced rails 89 rigidly supported at such station, on opposite sides of the line of mold travel. The rails are so particularly formed that, as the rollers of an advancing mold engage them and roll therealong, the sections of the mold are spread apart; held in spread-apart position while a completed bulb is removed, and then allowed to close again under the tension of springs 16a.

In order to insure that the mold-carrying head 10', which is in rotation as it leaves the point J (Fig. I) and advances to the discharge point C, shall be in proper angular position for the rollers 99 on the mold sections to co-operate with the stationary rails 89, I provide on the mold support 3a a detent 93 that is adapted to engage either of two notches 94 in the mold-carrying head and arrest rotation of the parts in the said proper position. A spring 95 normally maintains the detent in retracted position, so that the head 10' may rotate freely. The detent carries a roller 96 which engages a rail 97 as the mold approaches discharge point C, with the effect that the detent is projected into contact with the cylindrical side of the rotating head 10'. The rail 97 is yieldingly mounted, the mounting therefor including springs 98 of greater effective spring power than the spring 95 of the detent, whereby, when the advancing roller 96 makes contact with the rail 97, the detent is projected into engagement with the side of the rotating head 10', but the aggregate stress of the springs 98 is not so great as to cause the detent to arrest rotation of the head until one of the notches 94 reaches a position opposed to the tip of the detent and is engaged thereby. Thus, the rotating head 10' is arrested, with the rollers 99 in position to engage the rails 89 and spread the mold sections 1a'.

It will be understood that the invention is not limited to the production of incandescent lamp bulbs, and that it will find utility in the manufacture of many other sorts of hollow articles of glass. Within the ambit of the invention defined in the appended claims, various modifications in the method and apparatus described are held in contemplation.

I claim as my invention:

1. In apparatus for the production of glass articles, including a succession of traveling supports, rotary heads severally carried by said supports, means for rotating said heads as the supports travel, and segmental molds severally carried by and reciprocable in said rotary heads, the invention herein described that comprises means borne by the heads tending to shift the mold segments to positions of cooperation, electromagnets borne by said heads corresponding in number to the mold segments and associated one with each of said segments and adapted when energized to shift the said mold segments from their positions of cooperation, and means rendered effective by the advance of the supported heads to effect at a predetermined point in the path of advance the energizing of the magnets.

2. In apparatus for shaping glass articles, an endless chain of articulated supports, rotary heads severally borne by said supports, each head including a plurality of radially extending slideways, mold parts severally mounted in said slideways and movable in the slideways between active and inactive positions, the invention herein described which consists in means normally holding the mold parts upon each slideway yieldingly in active positions, and means rendered effective by the advance of each support-borne head for shifting the mold parts to inactive positions.

3. In apparatus for the production of glass articles, including a succession of traveling supports, rotary heads severally carried by said supports, means for rotating said heads in response to travel of the supports, and segmental molds, severally carried by said rotary heads; the invention herein described that comprises means normally holding the mold sections yieldingly to advanced positions, electro-magnetic means mounted in the rotary heads and engaging said mold segments and adapted when energized to shift the mold segments to retracted positions, and means including a contact element on each head and a stationary contact element adapted on the advance of the head to effect the energizing of the electromagnets of such head.

4. In a glass-blowing machine including a gob-receiving cavity formed of a horizontal ring-mold whose matrix includes a circumferential groove, a plunger that is vertically reciprocable on the axis of the ring-mold, and a funnel that is axially aligned with the plunger and removably assembled upon the ring-mold; the invention herein described that comprises plunger-reciprocating means adapted vertically to sustain said plunger in a position with its upper end above said groove in the ring-mold, said funnel having a bore of hour-glass shape, and the lower portion of such bore forming with the top of said plunger and with the matrix of said ring-mold a glass-shaping cavity that is provided with a constricted gob-receiving opening and a circumferential side wall that flares downward toward the groove in said ring-mold, and means for exerting a condition of suction in the bottom of such gob-receiving cavity.

HENRY F. TEICHMANN.